United States Patent [19]

Johnson

[11] Patent Number: 4,538,323

[45] Date of Patent: Sep. 3, 1985

[54] BEARING SUPPORTED TRUCK ASSEMBLY FOR SLIDING DOOR

[75] Inventor: Larry Johnson, Sterling, Ill.

[73] Assignee: Lawrence Brothers, Inc., Sterling, Ill.

[21] Appl. No.: 469,239

[22] Filed: Feb. 24, 1983

[51] Int. Cl.[3] ............................................ B60B 37/00

[52] U.S. Cl. ........................................ 16/98; 16/102; 16/DIG. 1; 16/DIG. 27

[58] Field of Search ..................... 16/102, 97, 98, 106, 16/107, 87 R, 87.4 R, 91, 92-101, 103-105, DIG. 1, DIG. 27; 308/189 R, 207 R

[56] References Cited

U.S. PATENT DOCUMENTS

| | | | |
|---|---|---|---|
| 768,137 | 8/1904 | McCabe | 16/98 |
| 1,476,550 | 12/1923 | Staples | 16/107 |
| 1,931,796 | 10/1933 | Hoffman | 16/98 |
| 2,940,112 | 6/1960 | Riser | 16/105 |
| 2,940,113 | 6/1960 | Riser | 16/105 |
| 3,193,870 | 7/1965 | McNinch | 16/97 |
| 3,287,759 | 11/1966 | Foltz | 16/87 |
| 3,479,682 | 11/1969 | McNinch | 16/97 |
| 3,708,827 | 1/1973 | Foltz | 16/98 |
| 3,739,424 | 6/1973 | Gorsolves | 16/98 |
| 3,793,673 | 2/1974 | Lawrence | 16/97 |
| 3,829,929 | 8/1974 | Foltz et al. | 16/97 |

*Primary Examiner*—James M. Meister
*Assistant Examiner*—John L. Knoble
*Attorney, Agent, or Firm*—Trexler, Bushnell & Wolters, Ltd.

[57] ABSTRACT

There is disclosed a truck assembly which is movable along a track and adapted to support a door panel, or the like, for corresponding movement. The truck assembly comprises wheel members mounted to a pair of axles. The axle are in turn supported by a carriage assembly which includes bearing arrangements for each wheel. The carriage assembly further includes holding means for maintaining the bearing assemblies in supportive position. A hanger member for the door panel is also provided, and is mounted to the carriage.

3 Claims, 5 Drawing Figures

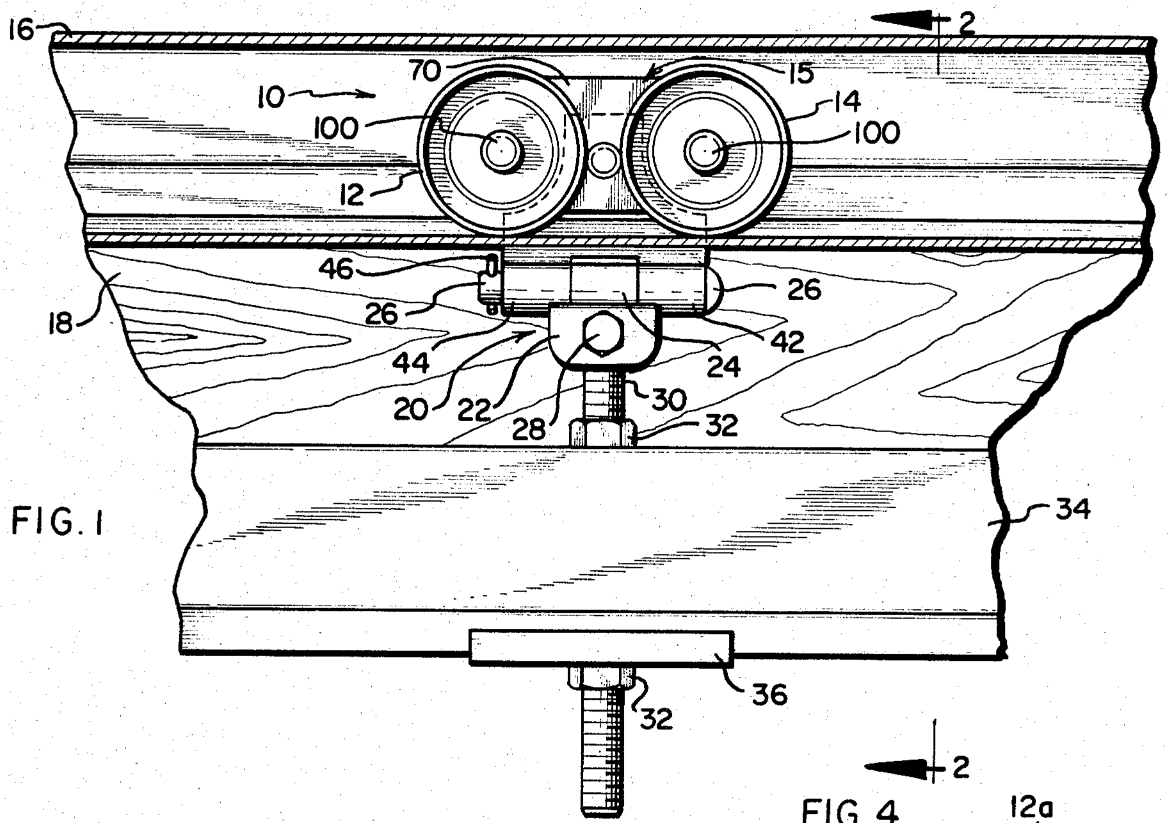
FIG. 1
FIG. 2
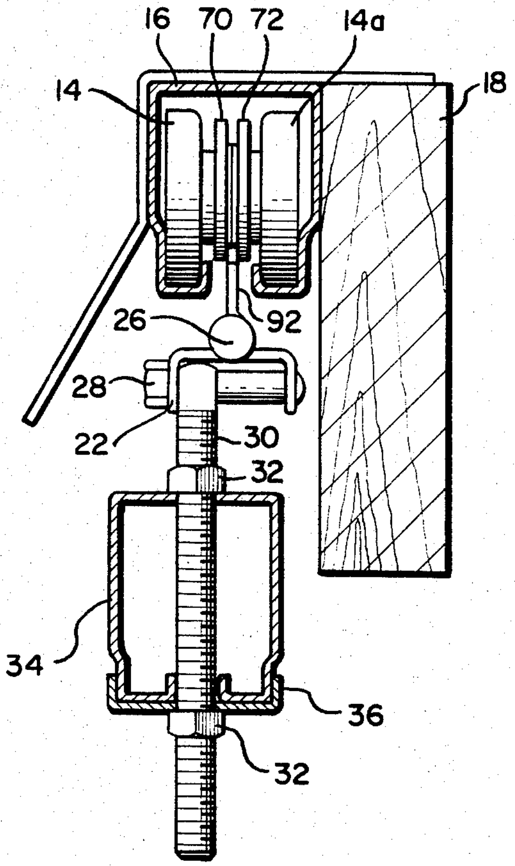
FIG. 4
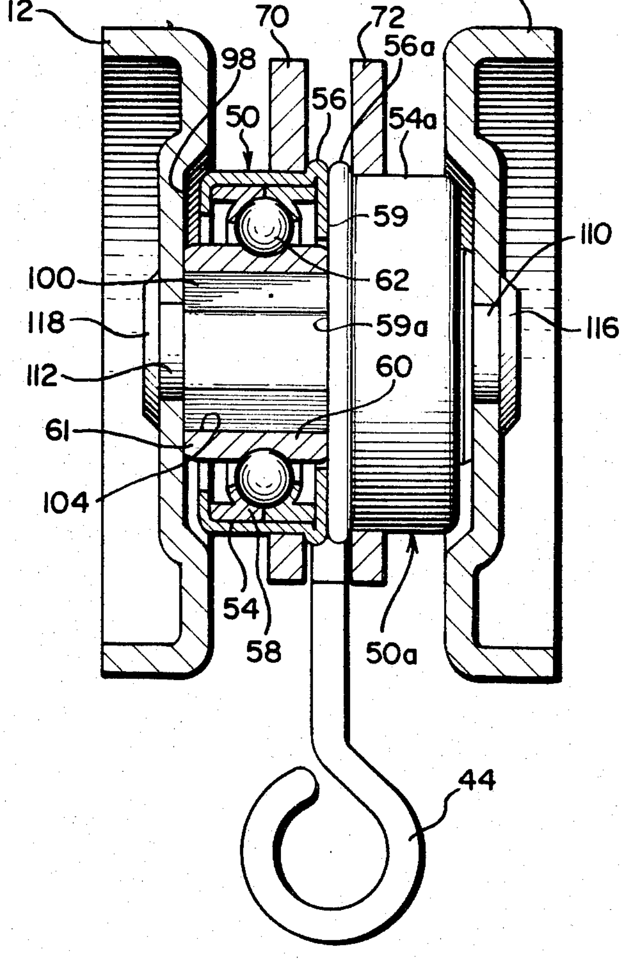

BEARING SUPPORTED TRUCK ASSEMBLY FOR SLIDING DOOR

BACKGROUND OF THE INVENTION

This application is directed generally to wheeled truck assemblies for sliding doors such as used in conjunction with industrial and farm buildings, wherein the assemblies are movable along a track; and more particularly to such a truck assembly including bearing supported wheel arrangements from which a door panel or the like, is suspended.

Truck assemblies of the foregoing type are known in the art. One particularly advantageous truck assembly is shown for example, in U.S. Pat. No. 3,793,673. While such prior art door-suspending truck assemblies have proven reliable in use, there is room for yet further improvement. More specifically, where relatively large heavy doors are involved wear on the truck assemblies during use can adversely affect the reliability of operation and the service life of the assemblies.

The present invention provides a truck assembly wherein a plurality of bearing arrangements are used to support the truck wheels. These bearing arrangements support and accommodate the load created by the door panel and provide for smooth, reliable operation while reducing overall wear.

OBJECTS AND SUMMARY OF THE INVENTION

Accordingly, it is a general object of the invention to provide a novel and improved truck assembly for suspending a door panel or the like for movement along a track.

A more particular object is to provide such a truck assembly which includes load support bearings, preferably by ball-type bearings.

A further object is to provide such a bearing supported truck assembly which consists of relatively few and simple parts, and hence is relatively simple and inexpensive to manufacture and assemble, and yet is highly durable and reliable in operation.

Briefly, and in accordance with the foregoing objects a truck assembly for suspending a door panel or the like for movement with respect to an overhead track comprises wheel means mountable for movement along said track; hanger means for mounting said door in depending relation; bearing means for the wheel means; and carriage means for supporting said wheel means, said hanger means and said bearing means in assembled condition; said carriage means comprising holding means for claimping said bearing means in supportive position with respect to said wheel means.

BRIEF DESCRIPTION OF THE DRAWINGS

The foregoing, as well as other objects, features and advantages of the invention will become more readily apparent upon reading the following detailed description of the illustrated embodiment, together with reference to the accompanying drawings, wherein:

FIG. 1 is a side elevation, partially broken away, of a truck assembly in accordance with the invention, suspending a door panel or the like from an overhead track;

FIG. 2 is an end view taken generally along the line 2—2 of FIG. 1;

FIG. 4 is a sectional view through a fully assembled truck assembly in accordance with the invention.

DETAILED DESCRIPTION OF THE ILLUSTRATED EMBODIMENT

Figure 5:
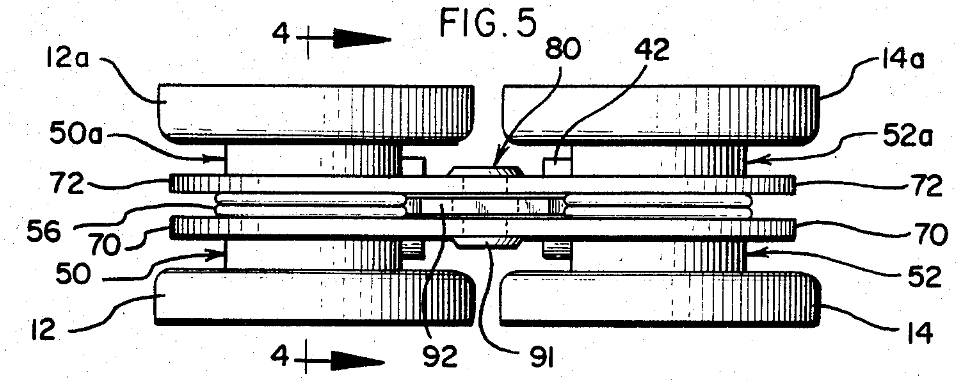
FIG. 5 is a top plan view of the fully assembled truck assembly in accordance with the invention.

Referring now to the drawings and initially to FIGS. 1 and 2, a door-suspending carriage or hanger truck assembly is designated generally by the reference numeral 10. In accordance with conventional practice, the truck assembly 10 includes pairs of axially spaced rollers or wheels 12, 12*a* and 14, 14*a* mounted to a carriage assembly, designated generally 15. These rollers are supported by and guided within a sidewall mounted horizontal track 16 carried by a header 18.

A door supporting assembly, designated generally 20, is suspended from the truck 10 and includes an integral, bifurcated sheet metal frame member 22. This sheet metal frame member 22 includes an upper sleeve portion 24 which comprises an integral curved extension thereof, and is located for accommodating a pivot pin 26. The axis of this pivot pin 26 extends substantially normal to the axis of the rollers 12, 14 and permits limited lateral swinging of the frame member 22 with respect to the track 16.

Frame member 22, as best viewed in FIG. 2, is generally U-shaped in cross-section, the respective side surfaces having through central apertures (not shown) which support a further pin 28. This latter pin 28 traverses the support member or frame 22 in a direction substantially normal to the axis of the first pivot pin 26. Suspended from the pin 28 is an elongate threaded rod or fastener member 30, which supports a door frame or panel 34. The latter rod or fastener member 30 is preferably provided with a suitable through bore or aperture at an upper end thereof for suspension from the pin 28. In accordance with conventional practice, the pin 28 and through bore or aperture of the rod 30 (not shown) may be complimentarily threaded, to permit lateral adjustment of the position of the door panel 34 with respect to the building to which it is mounted.

The fastener 30 includes thereon suitable mating internally threaded nuts 32 to adjust and maintain the vertical position of the door frame member 34. This door frame member 34 is here illustrated as a generally U-shaped channel member. An additional support channel or bracket member 36 may be suitably affixed to the otherwise open face of the channel 34 to provide additional support about the elongate threaded member or fastener 30.

The foregoing supporting assembly 20 is suspended from an integrally formed and preferably sheet metal hanger member 40. This member 40 includes axially spaced, coaxially aligned sleeve portions 42 and 44. These sleeves 42 and 44, as best viewed in FIG. 1, are spaced and located for receiving the previously mentioned sleeve 24 coaxially aligned therebetween, for thereby receiving the pivot pin 26 through all three of the coaxially aligned sleeve members 42, 24 and 44. A suitable keeper pin 46 may be provided to retain the pivot pin 26 with respect to the foregoing aligned sleeves as illustrated in FIG. 1.

The above discussed structure of FIG. 1 is generally conventional. Departing from convention, however, attention is now directed to the novel features of the truck assembly 10, which assembly includes the hanger member 40 briefly described above. In this regard, reference is now made to FIGS. 3, 4 and 5.

Advantageously, the truck assembly 10 includes bearing arrangements or assemblies to support the load of the door panel 34. To this end, each of the wheels or rollers 12, 14, 12*a*, 14*a* is supported by an associated bearing assembly 50, 52 and 50*a*, 52*a*, respectively.

As best viewed in FIG. 4, the bearings 50, 50*a* and 52, 52*a* are identical, preassembled self-contained units, and in the illustrated embodiment include ball-type bearings. Since these bearing assemblies are all substantially identical in configuration, only the bearing 50 will be described in detail. In this regard, the bearing assembly 50 includes a housing or shell 54 which is substantially annular, presenting a cylindrical outer surface. In accordance with a preferred form of the invention, the shell 54 includes, at an axially inner end thereof, a radially outwardly extending flange or abutment portion 56. The illustrated bearing 50 also includes an outer raceway 58 which is non-rotatably joined with the inner surface of the shell 54. An inner raceway 60 is provided radially inwardly spaced from outer raceway 58, with suitable bearing elements such as balls 62 therebetween. Preferably, the inner raceway 60 extends axially outward of the outer surface of the shell 54 as indicated at 61 to abut a facing surface of the wheel or roller 12.

In accordance with a feature of the invention, the carriage 15 includes mounting means for supporting the wheels or rollers 12, 14, the bearings 50, 52 and the hanger 40 in assembled condition. In the illustrated embodiment, this mounting means comprises a pair of substantially identical plates 70, 72 which are configured for holding the respective bearings 50, 50*a* and 52, 52*a* in supportive engagement with their associated wheels or rollers 12, 12*a* and 14, 14*a*. Additionally, the plates advantageously provide means for supporting the hanger 40 in depending relation therefrom without interference or contact with the bearings or rollers.

In the illustrated embodiment the supporting or mounting plates 70, 72 support the respective bearings 50, 50*a* and 52, 52*a* by means of suitable through apertures or openings 74, 76. These through apertures or openings 74 and 76 are dimensioned for surrounding engagement with the outer surfaces of the shells 54 of the respective bearings. Moreover, these through apertures 74 and 76 are formed in substantially flat or planar portions of the plate 70, which is here illustrated as a substantially flat, planar member throughout. Importantly, however, at least portions of the plate which face axially inwardly (as viewed in FIG. 4) and about respective apertures 74 and 76 define abutment surfaces for abutting the flared-out or flange portions 56 of the respective bearings. Hence, respective pairs of bearings, for example, 50, 50*a*, as viewed in FIG. 4, are held coaxially aligned with respective axially inner surfaces 59, 59*a* thereof abutting.

In this regard, it will be noted that the circumferentially extending flanges or abutment means 56 on the respective bearings need not be fully circumferentially formed as illustrated in the preferred embodiment herein. Rather, it will be recognized that a plurality of radially spaced projections will function equivalently in conjunction with the through apertures and surrounding surfaces of the respective mounting or supporting plates 70, 72.

The respective apertures 74, 76 are spaced along the length of the plates 70, 72. Intermediate these bearing supporting apertures 74 and 76 there is provided a further through bore or aperture 78. A suitable pin member 80, preferably a cylindrical pivot pin, is provided with reduced diameter axially outer end portions 82 and 84 for complimentary engagement through the respective apertures 78 of plates 70 and 72. The reduced diameter end portions serve to define oppositely facing shoulders 83 and 85 against which the plates 70 and 72 abut.

It will be recognized that upon supportive engagement of the respective plates 70 and 72 with the two pairs of bearings 50, 52 the respective parts thus far assembled may be brought into coaxial alignment as illustrated for example in FIG. 4. Thereupon, the respective through apertures 78 on the plates are also brought into coaxial alignment with the pin member 80 and in particular with the respective reduced diameter axially outer end portions 82 and 84 thereof, until the plates abut against shoulders 83 and 85. The axial length of the pin 80 intermediate these end portions 82 and 84, as indicated by arrow 90 is substantially equal to the sum of the axial extents of the respective flange or abutment portions 56, 56*a* of the respective paired bearings. Preferably, the axial extent of pin portions 82 and 84 is sufficient to permit deformation of the material thereof about the respective outer surfaces of the plate 70 and 72, as by staking or a similar operation. Thus, upon assembly the bearing arrangements 50; 52; 50*a*; 52*a* are disposed within the respective apertures 74 and 76 and abutment portions 56; 56*a* are engaged against the inner, opposed surfaces of the plates 70 and 72. Accordingly, when the end portions 82 and 84 of pin 80 are staked or deformed, the plates will clamp the bearing arrangements 50; 52; 50*a*; 52*a* in assembled position, with the engagement of the plates with shoulders 83 and 85 maintaining the spacing between the plates. Thus, the pin member 80 serves to hold the foregoing parts of carriage 15, of truck assembly 10 in assembled condition.

Prior to the foregoing assembly of the pin member 80 with the respective plates and bearings supported therein, however, the hanger member 40 is assembled with the pin 80. In this regard, the hanger member 40 includes a substantially flat plate-like portion 92 which has converging side surfaces 94, 96. Intermediate these side surfaces 94 and 96 is a suitable bore or aperture 98 for rotatable surrounding engagement with the central portion 90 of the pin 80. The sleeve portions 42, 44 previously described integrally depend from the flat plate-like portion 92 at a lower end thereof, that is, opposite the converging sides 94, 96. Accordingly, upon assembly of the hanger 40 in surrounding rotatable engagement with pin 80, the bearing supporting plates are brought together about the axially outer portions 82, 84 of the pin 80 and the protruding ends of these portions 82, 84 are staked or otherwise deformed over the axially outer surfaces of the respective plates 70, 72.

Finally, the respective wheels or rollers 12, 14 and 12*a*, 14*a* are mounted to the carriage assembly 15 thus far described. As indicated generally in FIG. 4 at reference numeral 61, the inner raceway members 60 of the respective bearings protrude in an axially outer direction for abutment with facing surfaces of the respective rollers or wheels. In the illustrated embodiment these latter surfaces of the wheels are designated at reference numeral 98. As best viewed in FIG. 4, these latter surfaces 98 of the wheels are provided by inwardly deforming a central portion of each wheel. Such deformation defines the depressed or inwardly deformed portions 98 having a diameter at least as great as the outer diameter of respective casings or housings 54 of the bearings.

The wheel members are mounted to the carriage assembly by a pair suitable axle members 100. Each axle member 100 includes a central portion 108 and reduced diameter end portions 110 and 112. The respective bearing units and wheel members include through apertures 104 and 106, respectively. In the illustrated embodiment these apertures are of different size and are polygonal in shape, the aperture 104 being defined in the inner raceway 60 of each bearing unit. Thus, the axles 100 may be assembled with the bearing units 50; 52; 50*a;* 52*a* by insertion within the aperture 104. The length of the central portion 108 of each axle 100 is such that it will accommodate the adjacent bearing units 50 and 50*a,* or 52 and 52*a* as the case may be. The wheel members 12; 12*a;* 14; 14*a* are engaged over the reduced diameter ends 110 and 112 which are then deformed or staked, as indicated at 116 and 118, respectively, in FIG. 4. The deformation of the end portions thereby effects a nonrotatable mounting of the wheel members to the axle members 100. It has also been found that the deforming operation performed on the axle end portion will cause the central portion 108 to swell or be deformed slightly, which serves to affix the axles 100 to the inner race 60 of the bearing units assembled thereon. Thus, the inner race members 60 and the axles 100 will rotate in unison along with the wheel members 12; 14; 12*a* and 14*a.*

Figure 3:
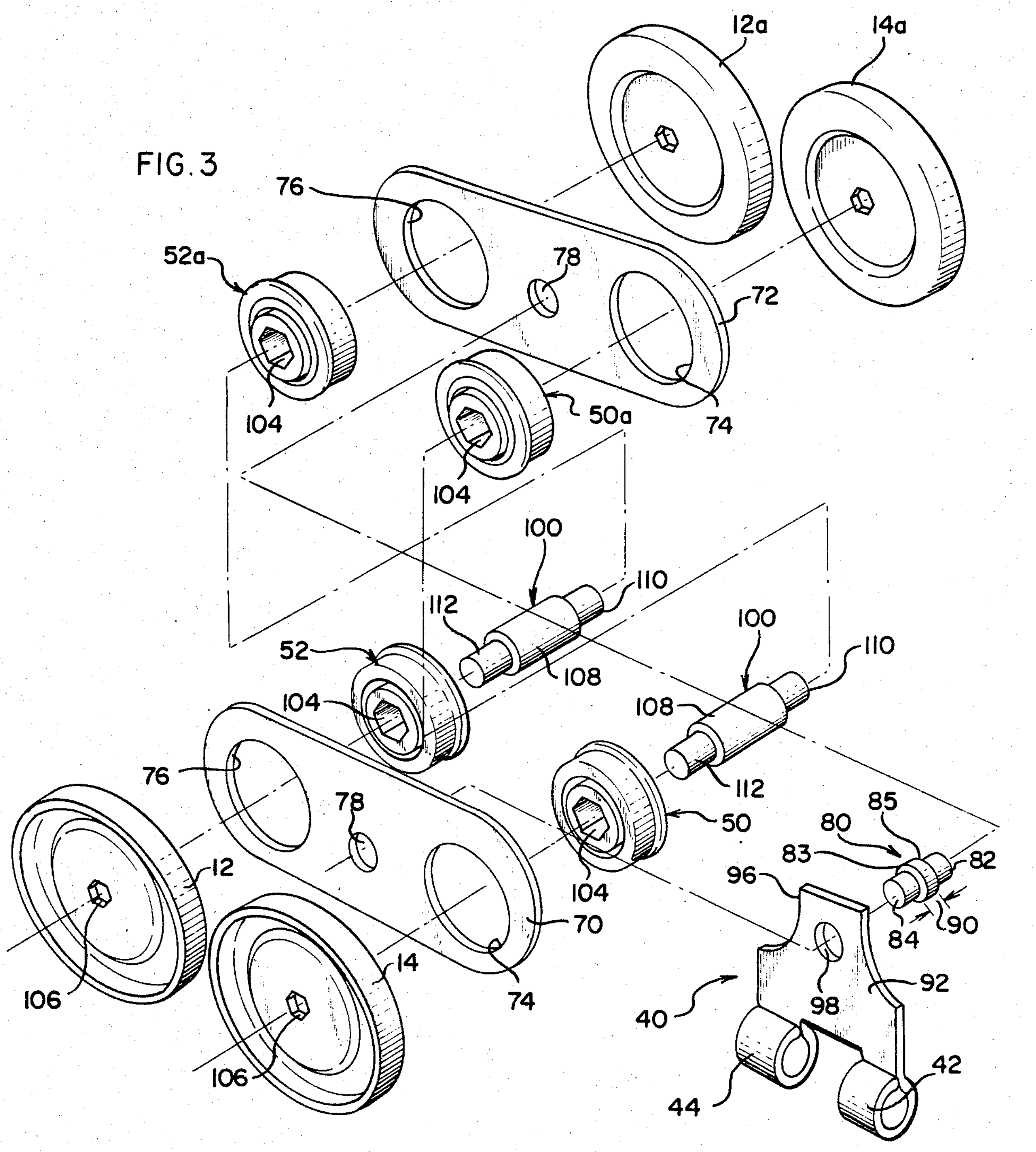
FIG. 3 is an exploded perspective view, illustrating the parts forming the truck assembly of the invention and indicating the manner in which these parts are assembled.

It will be appreciated that the present invention is not limited to the sequence of assembly as discussed with regard to FIG. 3. Alternatively, the axles 100 can be mounted to the bearing arrangements prior to their assembly to the plates 70 and 72. Also it should be noted that in the preferred form of the invention illustrated in the drawings, the bearing units or arrangements 50; 52; 50*a;* 52*a* are preassembled purchased components. That is to say that the shell 54, the raceways 58 and 60, and balls 62 are assembled as a unit prior to the assembly of the truck 10.

With the above discussion in mind, attention is again directed to FIG. 3 which it will be recalled is an exploded perspective of the overall truck assembly 10. In this regard, the truck assembly 10 utilizes duplication of the various parts or components in order to minimize the total number of different parts required. As such, the truck 10 is made up of only six (6) distinct parts, as follows: (1) the wheel members 12, 14; (2) hanger 40; (3) the bearing units 50, 52; (4) plates 70 and 72; (5) axles 100; and (6) pin 80. Also, these parts are easily assembled through use of convential jigs or fixtures employed with the presses which deform the ends of axles 100 and pin 80; the deformation of which is all that is used to maintain the components of FIG. 3 in assembly.

There has been illustrated and described herein a novel and improved truck assembly for suspending a door panel or the like for movement along a track. While the invention has been described with reference to a preferred embodiment, the invention is not limited thereto. Those skilled in the art may devise various alternatives, changes and modifications upon reading the foregoing descriptions. Such changes, alternatives, and modifications are to be considered as within the purview of the invention, insofar as they fall within the spirit and scope of the appended claims.

The invention is claimed as follows:

1. A truck assembly for suspending a door panel or the like, from a hanger track, said truck assembly being moveable along said track and comprising: a carriage assembly including hanging means for suspending a door panel, and at least a pair of wheel members carried by said carriage assembly and engageable with said track, said carriage assembly further including; a pair of apertured spaced plates; a pair of discrete pre-assembled self-contained bearing arrangements, each of said arrangement includes an axially inner and an axially outer end portion, an outer shell member having an abutment means formed on the exterior peripheral surface thereof adjacent an axially inner end thereof, and, a central, apertured hub member; and an axle member having a wheel member mounted to each end thereof, said preassembled self-contained bearing arrangements each being mounted on said axle in oppositely facing relation with said axle being received through the central, apertured hub of each said bearing arrangement, and one said bearing arrangement being disposed in each said plate aperture with the axially, inner ends of said bearing arrangements being in juxtaposition and with the plate member engaging the abutment means on the outer shell member of the bearing arrangement, such that said plate member maintains said bearing arrangements in clamped assembly therebetween, and means for holding the plate members in assembled relation.

2. A truck assembly according to claim 1, wherein said means for holding the plate members in assembled relation includes a pin member, and said hanging means comprises a plate-like member mounted to said pin member.

3. A truck assembly according to claim 1 wherein said means for holding the plates in assembly comprises a pin member engaged through each said plate and including oppositely facing shoulder means to maintain the spacing between said plate members, the ends of said pin member being deformed to maintain said plate member in assembly.

* * * * *